Patented Dec. 8, 1953

2,661,659

UNITED STATES PATENT OFFICE 2,661,659

MOUNTING MEDIUM FOR MICROSCOPE SLIDES AND METHOD OF SECURING THE COVER GLASSES THEREFOR

Andrés Ferrari, Jr., Uniondale, N. Y., assignor to Technicon Chemical Company, Inc., New York, N. Y., a corporation of New York No Drawing. Application January 27, 1951, Serial No. 208,242

6 Claims. (Cl. 88—40)

This invention relates to the preparation of histological tissue specimens for microscopic examination, and more particularly to the mounting of the cover glass for the stained tissue specimen on the glass slide.

In the preparation of tissue to enable the microscopic examination thereof it is conventional to mount a cover glass over the stained tissue specimen on the glass slide by bonding the cover glass to the slide by means of a resin. The resin is applied in the form of a solution; upon evaporation of the solvent the resin bonds the cover glass to the slide. Resins heretofore used for this purpose are Canada balsam, gum damar and synthetic resins, such, for example, as cycloparaffin or naphthene polymers. Resins heretofore employed have been objectionable for a number of reasons, among which may be mentioned:

1. They are not sufficiently transparent, i. e., have a relatively low refractive index.
2. They darken with age.
3. They develop acidity on aging, this is particularly the case in connection with natural resins, such as Canada balsam which forms acid on aging, causing the stains to fade or detrimentally affecting the tissue specimen.
4. They are not sufficiently inert to the tissue or do not remain so inert with age.
5. They become brittle on hardening causing the slides to crack more readily.
6. They tend to crystallize forming an unsightly scum border around the cover glass.
7. They soften under the temperature conditions to which the slides are subjected in use, for example, in microprojection work involving the use of carbon arc machines for projecting the slides.

The primary object of the present invention is to provide a novel method of securing the cover glass to the slide employing a resin which is substantially free of the above noted objections.

Other objects and advantages of this invention will be apparent from the following detailed description thereof.

In accordance with the present invention the cover glass is bonded to the glass slide containing the stained tissue specimen by means of a solution of a coumarone indene resin which is light in color, e. g. light amber, and has a melting point of at least 150° C., preferably from about 150° to about 175° C., in an aromatic hydrocarbon solvent, the solution containing from about 50% to about 60% by weight of the resin. The resin solution is applied to the specimen-carrying slide, a suitable applicator, such as a glass rod being employed for that purpose, and the cover glass is then placed in position. The resin solution spreads over the specimen between the slide and the cover glass and upon evaporation of the solvent the resin bonds the cover glass to the glass slide. The thin film of resin thus formed on the tissue is substantially colorless.

The resin, in accordance with this invention, is a coumarone indene resin made by polymerizing the coumarone and indene constituents present in a coal tar fraction, coke oven light oil or petroleum fraction and suitably refined so that the resultant resin is substantially colorless or water-white, has a melting point of at least 150° C., preferably from about 150° to about 175° C., a refractive index at 25° C. of 1.650, a molecular weight of 700 to 750, and is neutral having an acid number or value of less than 1. The resin may be heat polymerized or catalyst polymerized, as is well known in the art of producing coumarone indene resins. A preferred example of such resin is that manufactured and sold by The Neville Company under its trade designation Nevindene R–1, which has a color value of ½ on the Neville Color Rating. This color value of ½ corresponds to a color of from light amber to water-white of the Rosin Standards, the rosins of which are prepared in accordance with U. S. Department of Agriculture Standards.

As the solvent for the resin any aromatic hydrocarbon, such as benzene, toluene or xylene may be used. The preferred solvent is a petroleum benzene.

Surprisingly, it has been found the resin solution hereinabove described results in a marked improvement in the completed slide. The resin solution spreads smoothly into a flawless bond with the cover glass. It dries rapidly permitting handling of the freshly mounted slide soon after application of the cover glass. It hardens quickly without residual stickiness. The resin is chemically inert and does not fade or discolor the slides or deleteriously affect the tissue specimen even upon aging. The resin will not crack even upon aging and remains as clear as a polished lens. The resin will not darken upon aging. The resin does not crystallize or develop acidity with age. The slides can safely be used with high temperature light sources, as, for example, in microprojection work without softening of the resin bond between the slides and the cover glass. The resin has a relatively high refractive index as compared with the refractive indices of resins heretofore used with consequent improvement in the transparency of the completed slide.

Various changes may be made in the invention, in view of the above disclosure, without departing from the underlying idea or principles of the invention within the scope of the appended claims.

Having thus described my invention, what I claim and desire to secure by Letters Patent, is:

1. The method of securing a cover glass to a glass slide having thereon a specimen of stained tissue, which comprises bonding said cover glass to the slide by means of a water-white coumarone indene resin film having a melting point of from about 150° to about 175° C., an acid number of less than 1 and a refractive index of about 1.650 at 25° C.

2. The method of securing a cover glass to a glass slide having thereon a specimen of stained tissue, which comprises applying to the area of the glass slide to be contacted by said cover glass a benzene solution of a coumarone indene resin having a melting point of from about 150° to about 175° C., an acid number of less than 1, a refractive index of about 1.650 at 25° C., said solution containing from about 50% to about 60% by weight of said resin, and thereafter pressing said cover glass into contact with said glass slide in position to cover said tissue specimen so that upon evaporation of the solvent said resin bonds said cover glass to said slide.

3. A mounting medium for securing a cover glass to a glass slide having thereon a specimen of stained tissue, which medium consists essentially of from about 50% to about 60% by weight of a coumarone indene resin having a melting point of from about 150° to about 175° C., an acid number of less than 1 and a refractive index of about 1.650 at 25° C. dissolved in an aromatic hydrocarbon from the group consisting of benzene, toluene and xylene.

4. A mounting medium for securing a cover glass to a glass slide having thereon a specimen of stained tissue, which medium consists essentially of a benzene solution of a coumarone indene resin having a melting point of from about 150° to about 175° C., an acid number of less than 1, a refractive index of about 1.650 at 25° C., said benzene solution containing from about 50% to about 60% by weight of said resin and the color of which is from light amber to water white.

5. A microscope tissue-section slide comprising a glass slide having the tissue section thereon, a cover glass, and a bonding film interposed between said glass slide and cover glass and overlying said tissue section, said film consisting essentially of a coumarone indene resin having a melting point of from about 150° to about 175° C., an acid number of less than 1, a refractive index of about 1.650 at 25° C., and being substantially colorless.

6. The method of securing a cover glass to a glass slide having thereon a specimen of stained tissue to be covered by said cover glass with said cover glass contacting said slide along the area thereof contiguous to said specimen, which method comprises applying an aromatic hydrocarbon solution of a substantially colorless coumarone indene resin having a melting point of at least 150° C. and a refractive index of about 1.650 at 25° C., said solution containing from about 50% to about 60% by weight of said resin to at least one of the following; (a) the cover glass and (b) the area of the glass slide contacted by said cover glass, and thereafter pressing said cover glass into contact with said glass slide in position to cover said tissue specimen so that upon evaporation of the aromatic hydrocarbon the said resin bonds said cover glass to said slide.

ANDRÉS FERRARI, Jr.

References Cited in the file of this patent

UNITED STATES PATENTS

| Number | Name | Date |
| --- | --- | --- |
| 2,179,339 | Little | Nov. 7, 1939 |
| 2,267,151 | Gray | Dec. 23, 1941 |

FOREIGN PATENTS

| Number | Country | Date |
| --- | --- | --- |
| 202 | Great Britain | of 1884 |

OTHER REFERENCES

Gage, Text "The Microscope," 15th Ed. pages 412 thru 421, published by Comstock Publ. Co., Ithaca, New York, 1932.

Neville, Catalogue "Resins and Plasticizers" pages 5 thru 13 and 59 thru 63, Publ. by the Neville Co., Pittsburgh, Pa., 1945.